No. 819,344. PATENTED MAY 1, 1906.
J. F. DE JARNETTE.
VEHICLE WHEEL.
APPLICATION FILED MAY 22, 1905.
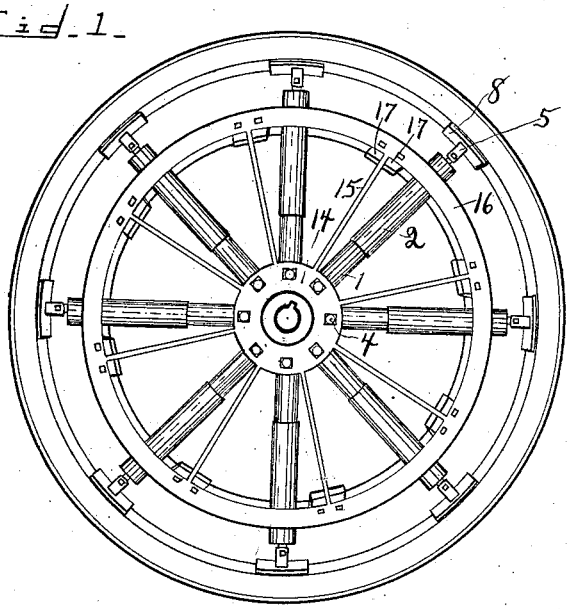
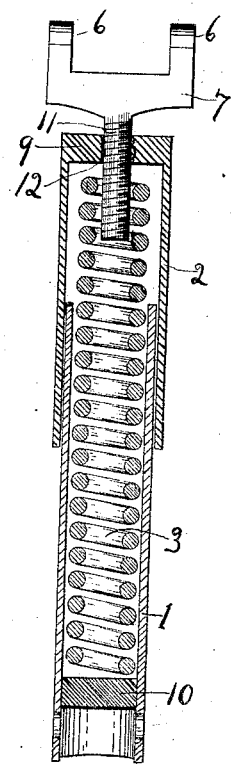
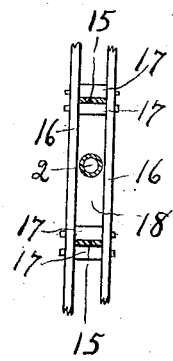

UNITED STATES PATENT OFFICE.

JAMES F. DE JARNETTE, OF OMAHA, NEBRASKA.

VEHICLE-WHEEL.

No. 819,344.

Specification of Letters Patent.

Patented May 1, 1906.

Application filed May 22, 1905. Serial No. 261,494.

*To all whom it may concern:*

Be it known that I, JAMES F. DE JARNETTE, a citizen of the United States, residing at Omaha, in the county of Douglas and State of Nebraska, have invented certain new and useful Improvements in Vehicle-Wheels, of which the following is a specification.

My invention relates to improvements in vehicle-wheels, and particularly the wheels of automobiles or similar vehicles, and has for its object a means for supporting the entire weight of the vehicle upon spiral springs so located and confined that the resilient effects of the springs bear directly upon the tire, thereby relieving the hub and vehicle of vibration incident to movement over uneven surfaces, also to provide a means for increasing or decreasing the resiliency of the springs.

With these objects in view my invention discloses novel construction and arrangement of parts, as shown herein and more fully illustrated by the drawings, wherein—

Figure 1 represents a vertical side view of my newly-invented vehicle-wheel, and in my construction both sides are identical. Fig. 2 is an end view of an outer inclosing member and adjacent devices to be explained more fully in detail. Fig. 3 is a sectional view of one of the series of spiral springs and inclosing members therefor.

I construct and place radially between the hub and tire the series of inclosing members 1 and 2, the inner series being mounted to have a slight swinging movement upon the pivot-bolt 4, and each member 1 is inclosed for a part of its length by the overlapping member 2, the latter being radially extended to a point near the tire, where a bearing is made by means of the bolt 5 passing through the slots 6 of the bolt-head 7 and the tire member 8. As thus constructed, the series of inclosing members 1 and 2 are positioned at regular radial distances apart similar to the spokes of a wheel secured at their extreme outer and inner ends, respectively, in a manner to prevent any sidewise movement, but otherwise permitting a slight turning movement upon their bolts 4 and 5.

I construct and place within the tubular walls of each of the series of inclosing members the spiral spring 3 with its end bearings 9 and 10, these bearings being integral with the adjacent walls of the inclosing members, and the bolt-head 7 is provided with a threaded shank 11, fitting within the grooves of the aperture 12 of the bearing 9.

Rigid with the caps 14 of the hub I construct the spokes 15, which terminate within the rings 16, and within the rings 16 I construct the detaining-blocks 17, and within the space 18 and between the series of detaining-blocks the inclosing member 2 is free to move, since each inclosing member is pivotally hung at 4 and 5. A part of the inclosing member 2 overlaps a portion of the inclosing member 1 and is adapted to readily revolve thereon by turning it with the hand, and it is evident that revolutions in one direction of the inclosing member 2 will tend to shorten the lengthwise space occupied by the spiral spring, and thereby increase the tension of said spring, and revolutions in the opposite direction will lengthen the space and will decrease the tension of the spring, as is obvious.

In operation, the wheels being mounted upon a vehicle, the entire weight is directed upon the lower series of springs, and as the wheel revolves the entire series of spiral springs are called into use in alternation. In starting or stopping the vehicle there will be a movement of the inclosing members toward the detaining-blocks 17 but since the construction of these blocks and their rings with the hub is rigid the inclosing members are held to a substantially true radial position upon the hub center, and the spiral springs receive any and all vibrations from the tire caused by moving over rough pavements or uneven surfaces.

Various modifications of minor details in my construction may be made without departing from the invention, its scope being determined by its claims.

What I claim as my invention is—

1. A vehicle-wheel, in combination, comprising a hub; coiled springs; a tire; a series of spokes rigidly mounted upon the hub and extending therefrom a part of the radial distance from the hub to the tire; annular rims; said annular rims being mounted rigid upon said series of rigidly-mounted spokes; resiliently-formed spokes; said resiliently-formed spokes being each composed of two tube portions having suitable spring-bearing ends, said tube portions of each spoke being of different diameters and of a length less than the radial distance from the hub to the tire; the end of one tube portion being pivotally mounted upon the hub, the end of the other tube portion of each tubular spoke inclosing the opposite end and part of the body of the other tube portion and forming within said tube portions a radially-extending chamber; one of said coiled springs being seated within each of chambers and extending lengthwise therein between said spring-bearing ends of said tube portions; said resiliently-formed spokes being disposed between and closely adjacent to said annular rims.

2. A vehicle-wheel, in combination; comprising a hub; a tire; spiral springs; resiliently-formed spokes; bearing-heads having thread-and-groove stems; each of said resiliently-formed spokes consisting of two radially-extending tube portions of differing diameters and each being of a less length than the radial distance from the hub to the tire; a part of one tube portion being inclosed by a part of the other tube portion; one of said tube portions having a closure at one end; said closure having a thread-and-groove aperture therein adapted to receive the stem of said bearing-head; said bearing-head being pivotally mounted upon said tire; the other tube portion having an end closure and mounted upon the hub at the end having said end closure; a longitudinal chamber formed within said tube portions and between said closures, and a spring seated therein.

3. A vehicle-wheel, in combination; comprising a hub; a tire; spiral springs; a series of spokes rigidly mounted upon the hub and extending therefrom a part of the radial distance from the hub to the tire; circular rim portions; said circular rim portions being mounted rigid upon said series of rigidly-mounted spokes; resiliently-formed spokes; said resiliently-formed spokes being each composed of two tube portions having suitable spring-bearing ends, said tube portions of each spoke being of different diameters and of a length less than the radial distance from the hub to the tire; the end of one tube portion being pivotally mounted upon the hub; the end of the other tube portion being pivotally mounted upon the tire; the opposite end of one tube portion of each of said resiliently-formed spokes inclosing the opposite end and a part of the body of the other tube portion, and forming within said tube portions a radially-extending chamber; one of said spiral springs being seated within each of said chambers and extending lengthwise therein between said spring-bearing ends of said tube portions; said resiliently-formed spokes being disposed between and closely adjacent to said circular rim portions; and means to increase or decrease the resiliency of said springs at will.

4. A vehicle-wheel, in combination; comprising a hub; a tire; spiral springs; resiliently-formed spokes; bearing-heads having thread-and-groove stems; circular rim portions; stop-blocks; a series of spokes rigidly mounted upon the hub and extending therefrom a part of the radial distance from the hub to the tire; said circular rims being mounted rigidly upon said series of rigidly-mounted spokes one upon either side of said spokes and at equal distances from said hub; each of said resiliently-formed spokes consisting of two radially-extending tube portions of differing diameters and each being of a less length than the radial distance from the hub to the tire; a part of one tube portion being inclosed by a part of the other tube portion; one of said tube portions having a closure at one end; said closure having a thread-and-groove aperture therein adapted to receive the stem of said bearing-head; said bearing-head being pivotally mounted upon said tire; the other tube portion having an end closure; a longitudinal chamber formed within said tube portions and between said closures, and one of said spiral springs seated therein; said stop-blocks being mounted rigidly between the transverse walls of the circular rim portions rigidly with said series of rigidly-mounted spokes; said resiliently-mounted spokes being adapted to have a radial movement upon their pivotal bearings between said circular rim portions and between said stop-blocks; and means to increase or decrease the resiliency of said springs at will, substantially as described.

In testimony whereof I have affixed my signature in presence of two witnesses.

JAMES F. DE JARNETTE.

Witnesses:
 ARTHUR STURGES,
 M. F. REYNOLDS.